(12) United States Patent
Kise et al.

(10) Patent No.: US 6,440,605 B1
(45) Date of Patent: *Aug. 27, 2002

(54) ELECTRODE, METHOD OR PRODUCING ELECTRODE, AND CELL COMPRISING THE ELECTRODE

(75) Inventors: Makiko Kise; Syoji Yoshioka; Jun Aragane; Hiroaki Urushibata; Hisashi Shiota; Takashi Nishimura; Shigeru Aihara; Daigo Takemura, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,685
(22) PCT Filed: Jun. 25, 1998
(86) PCT No.: PCT/JP98/02856
§ 371 (c)(1),
(2), (4) Date: Feb. 25, 2000
(87) PCT Pub. No.: WO99/67837
PCT Pub. Date: Dec. 29, 1999
(51) Int. Cl.[7] .............................. H01M 4/62; H01M 6/00
(52) U.S. Cl. ...................... 429/217; 29/623.1; 429/212; 429/215; 429/62
(58) Field of Search .................... 429/126, 62, 215, 429/217, 212; 29/623.1

(56) References Cited

U.S. PATENT DOCUMENTS 5,523,178 A * 6/1996 Murakami et al. ............ 429/53
6,153,332 A * 11/2000 Nishida et al. ............. 429/217

* cited by examiner

Primary Examiner—Patrick Ryan
Assistant Examiner—Tracy Dove
(74) Attorney, Agent, or Firm—Oblon, Spivak, McClelland, Maier & Neustadt, P.C.

(57) ABSTRACT

Conventional batteries have a problem that, in case the battery temperature should rise to or above a temperature at which the separator melts or flows due to an internal short-circuit, etc., a large short-circuit current develops to generate heat at the part where the separator flows. It follows that the battery temperature further increases, which can result in a further increase of the short-circuit current.

The invention has been completed to solve the abovementioned problem. It is an object of the invention to provide an electrode which increases its resistivity with temperature, a method of fabricating the electrode, and a battery using the electrode. Specifically, the electrode of the invention contains a resin which is in contact with an active material or a conducting agent and expands in volume with a rise in temperature.

13 Claims, 6 Drawing Sheets

FIG. 4

|  | POROSITY (%) | DISCHARGE CAPACITY | VOLUME RESISTIVITY ($\Omega \cdot$ cm) |
|---|---|---|---|
| EXAMPLE 1 | 30 | 4.3 | 150 |
| EXAMPLE 2 | 25 | 4.4 | 138 |

ELECTRODE, METHOD OR PRODUCING ELECTRODE, AND CELL COMPRISING THE ELECTRODE

TECHNICAL FIELD

This invention relates to an electrode, a method of fabricating the electrode, and a battery using the electrode. More particularly, it relates to an electrode whose resistivity changes with a rise in temperature, a method of fabricating the electrode, and a battery using the electrode.

BACKGROUND OF THE INVENTION

In recent years, with the development of electronic equipment, batteries used therein as a power source have increasingly gained in capacity and output density. A lithium ion secondary battery is attracting attention as a battery fulfilling these requirements. A lithium ion secondary battery has an advantage of high energy density but requires sufficient measures for safety because of use of a nonaqueous electrolytic solution.

Conventional safety measures include a safety valve which relieves an increased inner pressure and a PTC element which increases resistivity on heat generation due to an external short-circuit to shut off the electric current. For example, incorporation of a safety valve and a PTC element into the cap of a positive electrode of a cylindrical battery is known as disclosed in JP-A-4-328278. However, on the safety valve's working, moisture in the air enters the inside of the battery, which can induce an exothermic reaction in case lithium exists in the negative electrode.

On the other hand, a PTC element, which cuts off the external circuit involving a short-circuit, exerts no bad influence on operating. The PTC element can be designed to operate when the battery temperature rises to, for example, 90° C. or higher due to an external short-circuit so as to be the first safety element to operate in case of abnormality.

Having the above-mentioned structure, conventional lithium secondary batteries involve the following problem. When a short-circuit occurs in the inside of the conventional lithium secondary battery to raise the temperature, the battery is incapable of suppressing an increase in short-circuit current.

In the case where a short-circuit occurs in the inside of the lithium secondary battery to raise the temperature, a separator made of polyethylene or polypropylene interposed between a positive electrode and a negative electrode is expected to soften or melt to clog the pores of the separator, whereby the separator would exude a nonaqueous electrolytic solution contained therein or would seal the nonaqueous electrolytic solution within itself to reduce its ion conductivity thereby to diminish the short-circuit current. However, the part of the separator distant from the heat generating short-circuit does not always melt. Besides, when the temperature rises, it is likely that the separator melts and flows to lose its function of electric insulation between positive and negative electrodes, which can lead to a short-circuit.

In particular, in the case of a lithium ion secondary battery, the negative electrode is prepared by coating a substrate functioning as a current collector, such as copper foil, with a slurry comprising a negative electrode active material such as graphite, a binder such as polyvinylidene fluoride (PVDF), and a solvent, and drying the coating layer to form a film. The positive electrode is similarly prepared in a film format on a substrate functioning as a current collector, such as aluminum foil.

The positive electrode comprises a positive electrode active material, such as $LiCoO_2$, a binder, and a conducting agent. The conducting agent is to enhance electron conductivity of the positive electrode in case where the active material has poor electron conductivity. The conducting agent to be used includes carbon black (e.g., acetylene black) and graphite (e.g., KS-6).

When the temperature of such a battery increases to or above the temperature at which a separator between the positive and negative electrodes melts and flows due to, e.g., an internal short-circuit, a large short-circuit current flows between the positive and negative electrodes in the region where the separator flows. It follows that the battery temperature further increases by heat generation, which can result in a further increase of the short-circuit current.

The invention has been made in order to solve the above-described problem. An object of the invention is to provide an electrode which increases its resistivity with temperature, a method of fabricating the electrode, and a battery using the electrode.

DISCLOSURE OF THE INVENTION

A first electrode according to the invention comprises an active material, a conducting agent which is in electrical contact with the active material, and a resin which is in direct contact with the active material and/or the conducting agent and expands in volume with a rise in temperature. According to this aspect, the resin expands to increase its volume with a rise in temperature. As a result, the direct contact between the active material and the conducting agent is broken off to increase the resistivity of the first electrode. Accordingly, the current flowing through the electrode can be prevented from increasing in case of a temperature rise.

A second electrode according to the invention is characterized in that the resin has a melting point ranging from 90° C. to 160° C. Since a resin having a melting point ranging from 90° to 160° C. is used, the resistivity increases at a prescribed temperature or thereabouts within the range of from 90° to 160° C.

A third electrode according to the invention is characterized in that the resin has a particle size of from 0.05 μm to 100 μm. The particle size of the resin ranging from 0.05 to 100 μm, the electrode increases its resistivity at a prescribed temperature or thereabouts, and a battery using the electrode has an increased discharge capacity.

A fourth electrode according to the invention is characterized in that the resin is a crystalline resin. Containing a crystalline resin, the electrode exhibits a further increased rate of change in resistivity at a prescribed temperature or thereabouts.

A first battery according to the invention has a positive electrode, a negative electrode, and an electrolytic solution provided between the positive and the negative electrodes and is characterized in that the positive or negative electrode is any one of the above-described first to third electrodes. According to this aspect, since any one of the first to third electrodes is used as the positive or negative electrode, the battery has improved safety. That is, in case where the inner temperature of the battery rises to or above a prescribed temperature, the electrode increases the resistivity thereby to reduce the current flowing inside the battery A first method of fabricating an electrode according to the invention comprises the steps of:

(a) dispersing the above-described conducting agent, active material and resin powder to make an active material paste and (b) pressing the active material paste having been dried at a prescribed temperature under a prescribed pressure.

A second method of fabricating an electrode according to the invention is characterized in that the prescribed temperature is the melting point of the resin or thereabouts. Since the prescribed temperature is the melting point of the resin or thereabouts, the resin undergoes deformation and enters among adjacent positive electrode active material particles, among adjacent conducting agent particles, and between the positive electrode active material and the conducting agent that are adjacent to each other. Therefore, the resin efficiently functions in severing the contact among the positive electrode active material particles, the contact among the conducting agent particles, and the contact between the positive electrode active material and the conducting agent in case of abnormality. As a result, the increase in electrode resistivity can be made higher in case of a rise over a prescribed temperature.

BRIEF DESCRIPTION OF THE DRAWINGS

FIG. 4 is table showing the porosity of an electrode and the discharge capacity characteristic of the battery.

BEST MODE FOR CARRYING OUT THE INVENTION

Figure 1:
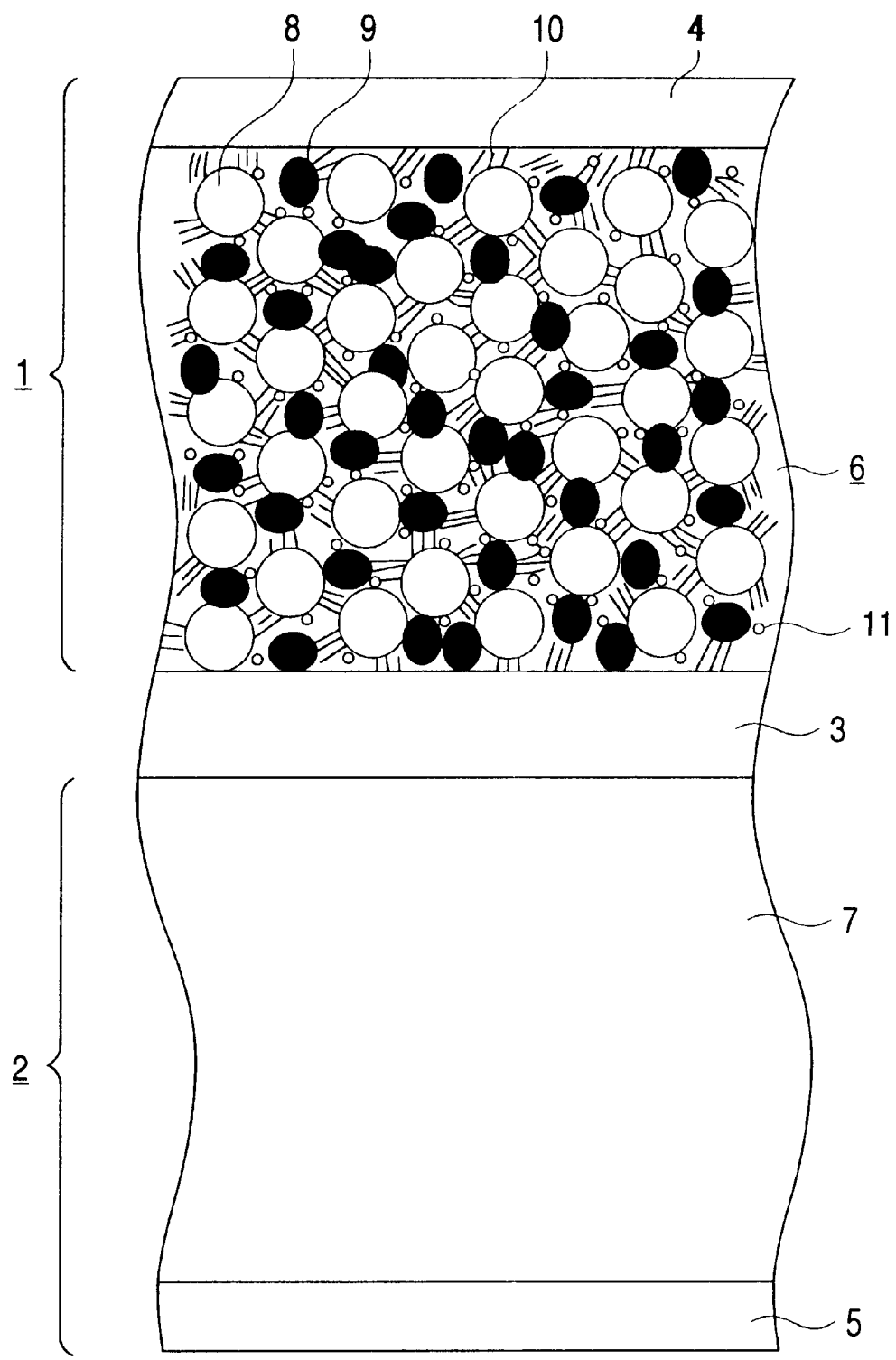
FIG. 1 is an illustration explaining the structure of the battery.

FIG. 1 is an illustration explaining the structure of the battery according to the invention. More specifically, it is a cross-sectional view of the battery. In the Figure, numeral 1 indicates a positive electrode; 2 a negative. electrode; and 3 a separator provided between the positive electrode 1 and the negative electrode 2.

The positive electrode 1 has a positive electrode current collector 4 and a positive electrode active material layer 6. The negative electrode 2 has a negative electrode current collector 5 and an negative electrode active material layer 7.

The positive electrode 1 is composed of the positive electrode active material layer 6 formed on the surface of a metal film (e.g., an aluminum film) which serves as the positive electrode current collector 4. The negative electrode 2 is composed of the negative electrode active material layer 7, being formed on the surface of a metal film (e.g., a copper film) which serves as the negative electrode current collector 5, comprising a negative electrode active material such as carbon particles bound together by a binder. The separator 3 holds an electrolytic solution containing, for example, lithium ions.

The positive electrode active material layer 6 comprises a positive electrode active material 8, a conducting agent 9, a binder 10, and a resin 11. The positive electrode active material 8 includes, for example, a cobalt oxide, a manganese oxide, and an iron oxide. The cobalt oxide includes $LiCoO_2$ crystals and $LiCoO_2$ crystals part of the Co atoms of which are displaced with transition metal atoms (e.g., Ni atom and Mn atom). The conducting agent 9 to be used includes a conducting agent.

The positive electrode active material 8 and the conducting agent 9 are particles. The resin 11 is particles smaller than the positive electrode active material 8 and the conducting agent 9.

The positive electrode active material 8, the conducting agent 9, and the resin 11 are bound together with the binder 10 so that part of them are in contact with each other.

The resin 11 possesses the property of expanding in volume with a rise in temperature. In particular, it has a melting point in a temperature range of from 90 to 160° C., in the vicinity of which it melts to expand. On the resin's expanding, the contact among the conducting agent particles 9 and the contact between the positive electrode active material 8 and the conducting agent 9 are broken off. Therefore, the electron conduction in the positive electrode active material layer 6 is reduced near the melting point of the resin 11, and the electrode (particularly the positive electrode active material layer 6 of the positive electrode 1) shows an abrupt increase of the rate of change in resistivity. As a result, the resistivity of the electrode steeply rises. This function of the resin will hereinafter be referred to as PTC (positive temperature coefficient).

Where a crystalline resin is used as the resin 11, the rate of resistivity change around a prescribed temperature can be increased further.

The resin 11 is a polymer, such as high-density polyethylene (melting point: 130 to 140°), low-density polyethylene (melting point: 110 to 112° C.), a polyurethane elastomer (melting point: 140 to 160° C.), and polyvinyl chloride (melting point: about 145° C.). The melting point of these resins is in a range of from 90° to 160° C.

When heated higher than the melting point, the resin 11 softens or melts to expand in volume, whereby the contact among the positive electrode active material particles 8, the contact among the conducting agent particles 9, and the contact between the positive electrode active material 8 and the conducting agent 9, which are maintained in the normal state (at temperatures lower than the melting point), are severed. The PTC function is thus activated to reduce the electron conductivity of the positive electrode 1 (specifically the positive electrode active material layer 6) and to increase the electrode resistivity.

Because the temperature at which the PTC function is activated is dependent on the melting point of the resin 11, the temperature at which the PTC function is manifested can be set at a prescribed temperature between 90° and 160° C. by selecting the material or kind of the resin. The PTC characteristics may be either reversible so that it could be manifested twice or more or irreversible so that the initial resistivity is not restored even when a temperature drop follows manifestation of the PTC function.

Although it is favorable for security that the PTC function is manifested at or below 90° C., the electrode would increase its resistivity in a temperature range in which batteries are usually used. This will lead to reduction of battery performance, such as load rate characteristics. If the temperature for manifestation of the PTC function exceeds 160° C., the inner temperature of a battery could rise up to that temperature, which is unfavorable for safety. Accordingly, it is desirable to design so that the PTC function may be manifested at a temperature ranging from 90° to 160° C.

Since the temperature at which the PTC function is activated is dependent on the melting point of the resin 11, the resin 11 is selected from those having a melting point within a range of from 90° to 160° C.

The resistivity of the electrode (positive electrode 1) in its normal state (i.e., before manifestation of the PTC function)

can be controlled by varying the proportion of the resin in the whole positive electrode active material layer 6.

Where the electrode having the above-mentioned properties is applied to a battery (specifically as a positive electrode 1), in case the current should increase due to a short-circuit either outside or inside the battery, and the temperature of the battery or the electrode should rise to or above the temperature for manifestation of the PTC characteristics (in the vicinity of the melting point of the resin), the positive electrode active material layer 6 increases its own resistivity. It follows that the current flowing inside the battery drops.

Accordingly, a battery assembled by using the electrode will have markedly improved safety. That is, the safety will be maintained even in case of abnormalities, such as a short-circuit under strict conditions, a back charge, an overcharge, and the like.

The shape of the particulate resin 11 can be fibrous or flaky. The point is that the shape of the resin 11 is no object as far as it is of such size that it can locate between adjacent positive electrode active material particles 8, between adjacent conducting agent particles 9, and between the positive electrode active material 8 and the conducting agent 9 that are adjacent to each other.

While the invention has been described with reference to a particular structure in which the positive electrode 1, especially the positive electrode active material layer 6 has a positive electrode active material 8, the conducting agent 9, the binder 10, and the resin 11, the invention is not limited thereto. The same effects are produced from batteries in which the negative electrode 2, especially the negative electrode active material layer 7 has a negative electrode active material (not shown), a conducting agent (not shown), a binder (not shown), and a resin (not shown). In this case, a negative electrode active material having high conductivity, such as carbon particles, is chosen. Such a negative electrode active material combines the function as a conducting agent so that there is no need to use a conducting agent other than the negative electrode active material.

Where a particulate electron conductive material comprising a conductive filler and a resin 11 is used as a conducting agent 9, the rate of change of the electrode resistivity at about the melting point of the resin 11 can be increased further.

In the following are described an example of a process for preparing the positive electrode 1, an example of a process for preparing the negative electrode 2, and an example of a process for preparing a battery using the positive electrode 1 and the negative electrode 2.

Process for Preparing Positive Electrode:

Powder of a resin 11 whose melting point is between 90° C. and 160° C., a conducting agent, a positive electrode active material (e.g., $LiCoO_2$), and a binder (e.g., PVDF) are dispersed in a dispersing medium (e.g., N-methylpyrrolidone, hereinafter abbreviated as NMP) to prepare a positive electrode active material paste. The resulting paste is applied to a current collector substrate (e.g., a metal film of prescribed thickness), which serves as a positive electrode current collector 4. After drying the paste, the paste is pressed at a prescribed temperature under a prescribed planar pressure to obtain a positive electrode 1 having a positive electrode active material layer 6 of prescribed thickness formed on the positive electrode current collector 4.

According to the above-described process for preparing an electrode (specifically the positive electrode 1), since the pressing is carried out at a prescribed temperature under a prescribed planar pressure, adhesion between the positive electrode active material layer 6 and the positive electrode current collector 4 is improved thereby to reduce the contact resistance between the positive electrode active material layer 6 and the positive electrode current collector 4. The connection among the conducting agent particles 9 is also improved thereby to form more current collecting networks in the positive electrode active material layer 6. As a result, the positive electrode active material layer 6 has a reduced resistivity in its normal state. Thus, the resistivity of the electrode in its normal state can be reduced.

Additionally, the adhesion between the resin 11 and the conducting agent 9 and the adhesion between the resin 11 and the active material (the positive electrode active material 8) are improved. As a result, the resin 11 can function efficiently so that the resistivity of the electrode can be increased high in case of abnormality.

In short, the electrode resistivity in a normal state and that in an abnormal state can be well balanced by adjusting the temperature and pressure (planar pressure) in pressing the electrode.

In particular, where the prescribed temperature is set at the melting point of the resin 11 or thereabouts, the resin 11 is deformed and enters among adjacent positive electrode active material particles 8, among adjacent conducting agent particles 9, and between the positive electrode active material 8 and the conducting agent 9 that are adjacent to each other. Therefore, the resin 11 efficiently functions in severing the contact among the positive electrode active material particles 8, the contact among the conducting agent particles 9, and the contact between the positive electrode active material 8 and the conducting agent 9 in case of abnormality. Thus, the electrode resistivity can be increased higher in case of abnormality.

While the process has been described with reference to the example in which a dried positive electrode active material paste is pressed at a prescribed temperature under a prescribed planar pressure, the positive electrode 1 may also be obtained by first pressing the dried positive electrode active material paste under a prescribed planar pressure and then heating the positive electrode active material paste at a prescribed temperature (desirably the melting point or thereabouts).

A process for preparing the negative electrode 2 is described below.

Process for Preparing Negative Electrode:

A negative electrode active material paste is prepared by dispersing mesophase carbon microbeads (hereinafter abbreviated as MCMB) as a negative electrode active material and PVDF in NMP. The resulting paste is applied to a current collector substrate (e.g., a metal film of prescribed thickness) which will serve as a negative electrode current collector 5, dried, and pressed at a prescribed temperature under a prescribed pressure to obtain a negative electrode 2 having a negative electrode active material layer 7.

A method of fabricating the battery will be described.

Method of Fabricating Battery:

The positive electrode 1 and the negative electrode 2 prepared above are joined together with a porous polypropylene sheet interposed therebetween, and an electrolytic solution is poured therein to obtain a battery having the positive electrode 1 and the negative electrode 2. The battery thus obtained increases the resistivity of the positive electrode 1 thereof with an increase in temperature. In case a short-circuit should occur outside or inside the battery to raise the battery temperature, the battery is capable of reducing the short-circuit current thereby securing improved safety.

EXAMPLE 1

Preparation of Positive Electrode:

A positive electrode active material paste was prepared by dispersing 91 parts by weight of a positive electrode active material (e.g., $LiCoO_2$), 2 parts by weight of a binder (e.g., PVDF), 6 parts by weight of a conducting agent (e.g., artificial graphite KS-6, produced by Lonza), and 2 parts by weight of a powdered resin (e.g., powder of a high-density polyethylene having an average particle size of 0.1 $\mu$m and a melting point of 135° C.) in NMP, a dispersing medium. The resulting paste was applied to a 20 $\mu$m thick metal film (aluminum foil) functioning as a positive electrode current collector 4 by a doctor blade coating method and dried at 80° C. The dried paste was pressed at a prescribed temperature (e.g., room temperature) under a prescribed planar pressure (e.g., 2 ton/$cm^2$) to form a positive electrode active material layer 6 having a thickness of about 100 $\mu$m. There was thus obtained a positive electrode 1 having the positive electrode active material layer 6 on the positive electrode current collector 4.

Preparation of Negative Electrode:

A negative electrode active material paste prepared by dispersing 90 parts by weight of MCMB and 10 parts by weight of PVDF in NMP was applied to 20 $\mu$m thick copper foil, a negative electrode current collector 5, by a doctor blade coating method, dried at 80° C., and pressed at room temperature under a pressure of 2.0 ton/$cm^2$ to obtain a negative electrode 2 having a negative electrode active material layer 7 on the negative electrode current collector 5.

Evaluation of Electrode and Battery:

The electrodes of the invention and batteries using the electrode were evaluated in accordance with the following test methods.

Measurement of Resistivity of Electrode:

Aluminum foil was fusion bonded to both sides of an electrode. A voltage terminal and a current terminal of plus side were connected to the aluminum foil on one side, and those of minus side to the aluminum foil on the other side. The terminals were equipped with a heater. A constant current was made to flow through the device while heating the electrode at a rate of 5° C./min, and a reduction in voltage was measured to determine the resistivity (volume resistivity: $\Omega \cdot cm$).

Capacity Test:

The positive electrode 1 and the negative electrode 2 prepared above, both cut to a size of 14 mm×14 mm, were joined together with a porous polypropylene sheet (Cell Guard #2400, produced by Hoechst) interposed therebetween as a separator 3 to prepare a battery body. A current collecting tab was spot welded to each of the positive electrode current collector 4 and the negative electrode current collector 5, and the battery body was put in a bag made of an aluminum laminate sheet. An electrolytic solution prepared by dissolving lithium hexafluorophosphate in a mixed solvent of ethylene carbonate and diethyl carbonate (1:1 by mole) in a concentration of 1.0 mol/$dm^3$ was poured into the bag, and the opening of the bag was heat-sealed to complete a battery. The resulting battery was subjected to a charge and discharge test at room temperature, and the discharge capacity at 2C (C: hour rate) was measured.

Nail Test:

The positive electrode 1 and the negative electrode 2 prepared abovewere bothcut to a size of 50 mm×50 mm. The positive electrode 1 and the negative electrode 2 were joined with a porous polypropylene sheet (Cell Guard #2400, produced by Hoechst) interposed therebetween as a separator 3 to prepare a unit electrode body. Ten unit electrode bodies were piled up, and a current collecting tab was connected to the end of every positive electrode current collector 4 and every negative electrode current collector 5 and spot-welded among the positive electrodes and among the negative electrodes to electrically connect the unit electrode bodies in parallel to form a pack of battery bodies. The pack of battery bodies was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/$dm^3$ was put in the bag, and the opening of the bag was heat-sealed to complete a battery.

The resulting battery was charged at 800 mA to 4.2 V at room temperature. After completion of charging, an iron nail 2.5 mm in diameter was stuck into the center of the battery, and the battery temperature was measured.

Figure 2:
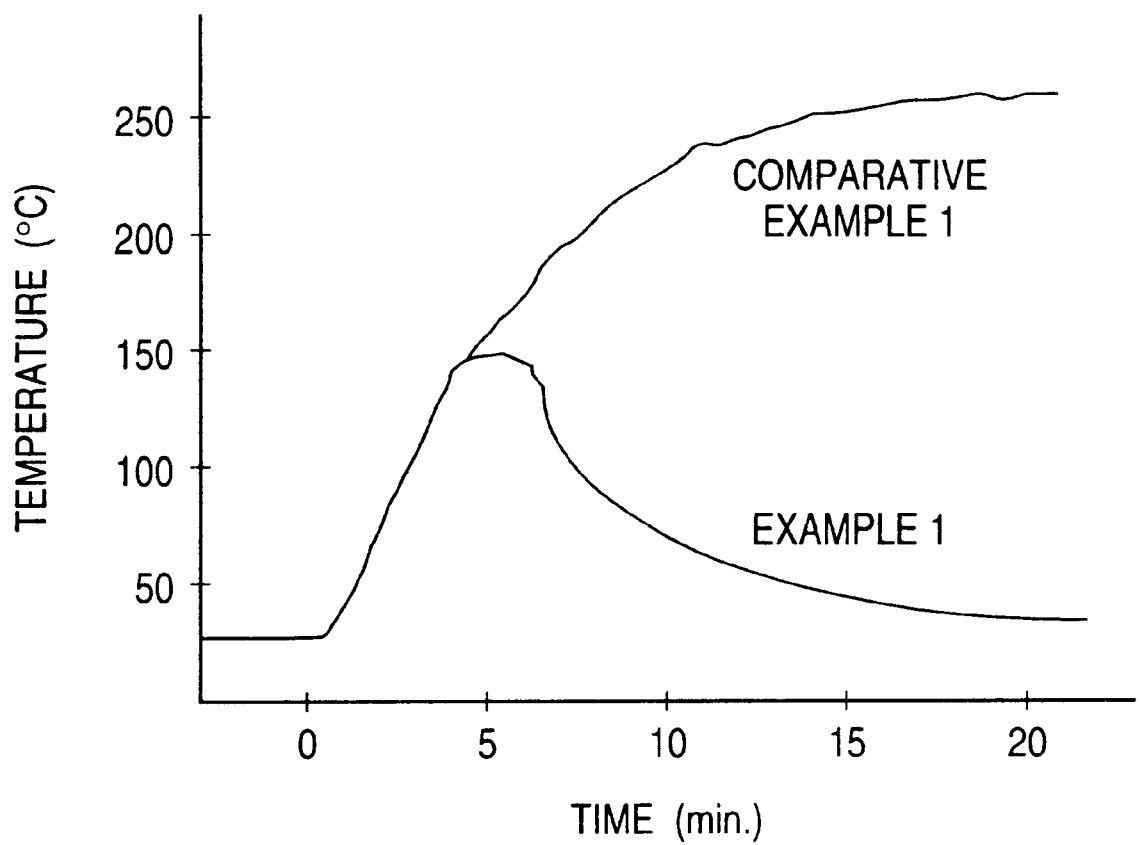
FIG. 2 is a graph showing the relationship of battery temperature and passage of time in a nail test.

FIG. 2 is a graph showing the characteristics of batteries. More specifically, FIG. 2 is a graph showing the relationship between battery temperature and passage of time in the nail test carried on the battery having the electrode of Example 1 and the battery having the electrode of Comparative Example 1.

The positive electrode of Comparative Example 1 shown in the Figure was prepared as follows. A positive electrode active material paste was prepared by dispersing 90 parts by weight of a positive electrode active material (e.g., $LiCoO_2$), 4 parts by weight of PVDF, and 6 parts by weight of an electron conductive material (e.g., artificial graphite KS-6, produced by Lonza) in NMP. The resulting positive electrode active material paste was applied to 20 $\mu$m thick aluminum foil serving as a positive electrode current collector 4 by a doctor blade coating method to form a positive electrode active material film. The film was dried at 80° C. and pressed at room temperature under a pressure of 2.0 ton/$cm^2$ to form an about 100 $\mu$m thick positive electrode active material layer 3 on the positive electrode current collector 4.

The negative electrode of Comparative Example 1 was prepared in the same manner as in Example 1.

Because the battery using the electrode of Example 1 manifests the PTC function when its temperature rises near a prescribed temperature, the battery temperature begins to fall within 5 minutes after the temperature rises to about 150° C. The battery using the electrode of Comparative Example 1 continues increasing its temperature with time.

It is understood from a comparison between Example 1 and Comparative Example 1 that the battery of Example 1 which contains the resin 11 in the electrode thereof (i.e., the positive electrode active material layer 6 of the positive electrode 1) manifests the PTC function upon the inner temperature's exceeding a prescribed temperature to reduce the short-circuit current before the temperature exceeds 160° C. Therefore, the battery of Example 1 has improved safety and reliability.

Figure 3:
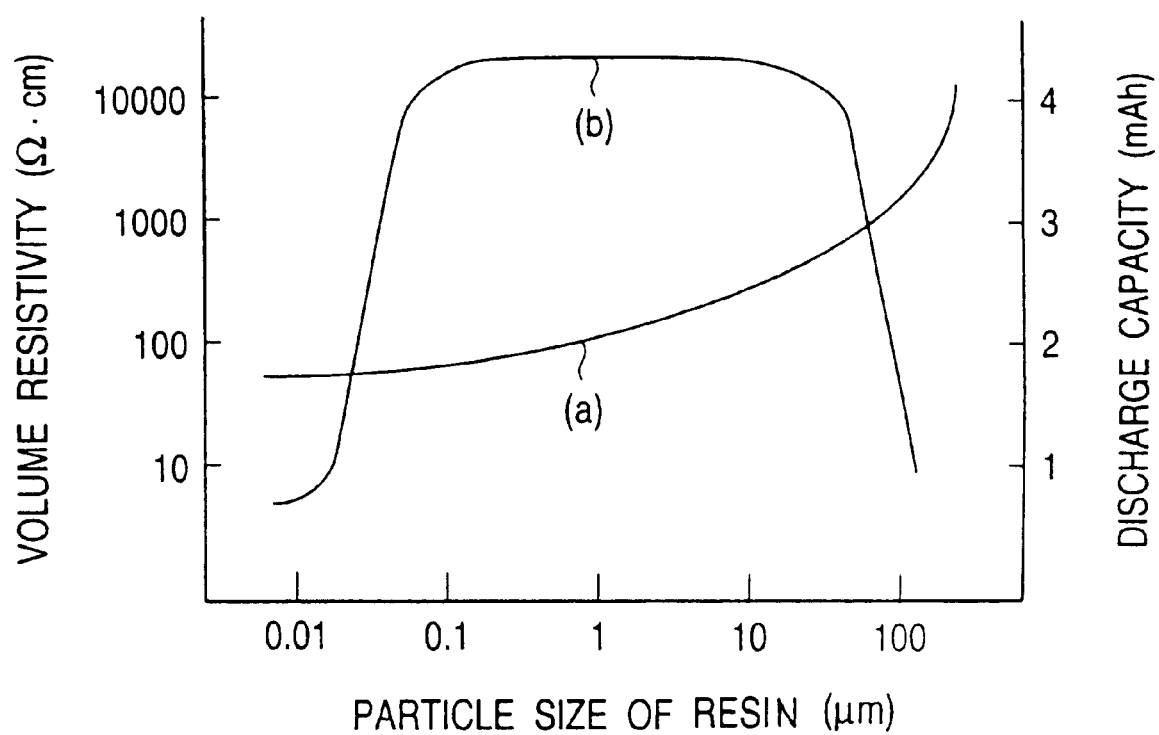
FIG. 3 is a graph showing the relationship between the particle size of the resin contained in an electrode and the resistivity of the electrode and the relationship between the particle size of the resin and discharge capacity.

FIG. 3 is a graph showing the relationship between the particle size of the resin contained in the electrode and the resistivity of the electrode (curve (a)) and the relationship between the particle size of the resin and discharge capacity (curve (b)). Having a particle size of 0.05 $\mu$m or smaller, the resin 11 has a reduced packing, which means that the volume of the resin 11 per unit volume of the positive electrode active material layer 6 increases, that is, the weight of the positive electrode active material decreases. In other words, if the particle size of the resin 11 is 0.05 $\mu$m or smaller, the discharge capacity is lessened. If the particle size of the resin 11 is 100 $\mu$m or greater, the resistivity of the electrode itself becomes high, and the discharge capacity decreases.

Accordingly, where the resin 11 has an average particle size of 0.05 to 100 μm, the resistivity of the electrode in its normal state can be reduced. Further, the resin 11 of this size can locate between adjacent positive electrode active material particles 8, between adjacent conducting agent particles 9, and between the positive electrode active material 8 and the conducting agent 9 adjacent to each other and, in case of abnormality, efficiently breaks off the contact among the positive electrode active material particles 8, the contact among the conducting agent particles 9, and the contact between the positive electrode active material 8 and the conducting agent 9 to increase the resistivity of the electrode in an abnormal state. Furthermore, the electrode containing the resin 11 of this size provides a battery having a more desirable discharge capacity in its normal state.

With the average particle size of the resin 11 ranging from 0.1 to 50 μm, particularly 0.5 to 20 μm, the resistivity of the electrode is reduced in the normal state and increased in an abnormal state, and the battery using the electrode has a more desirable discharge capacity in its normal state.

EXAMPLE 2

Preparation of Positive Electrode:

A positive electrode active material paste was prepared by dispersing 91 parts by weight of a positive electrode active material (e.g., $LiCoO_2$), 2 parts by weight of a binder (e.g., PVDF), 6 parts by weight of a conducting agent (e.g., artificial graphite KS-6, produced by Lonza), and 2 parts by weight of a powdered resin (e.g., powder of high-density polyethylene having an average particle size of 0.1 μm and a melting point of 135° C.) in NMP, a dispersing medium. The resulting positive electrode active material paste was applied to a 20 μm thick metal film (aluminum foil) functioning as a positive electrode current collector 4 by a doctor blade coating method, dried at 80° C., and pressed at a prescribed temperature (e.g., 135° C., the melting point of the high-density polyethylene powder) under a prescribed planar pressure (e.g., 0.5 ton/cm$^2$) to form a positive electrode active material layer 6 having a thickness of about 100 μm. There was thus obtained a positive electrode 1 having the positive electrode active material layer 6 on the positive electrode current collector 4.

Preparation of Negative Electrode:

A negative electrode active material paste prepared by dispersing 90 parts by weight of MCMB and 10 parts by weight of PVDF in NMP was applied to 20 μm thick copper foil, a negative electrode current collector, by a doctor blade coating method, dried at 80° C., and pressed at room temperature under a pressure of 2.0 ton/cm$^2$ to obtain a negative electrode 2 having a negative electrode active material layer 7 on the negative electrode current collector 5.

FIG. 4 is a table showing the characteristics of the battery using the resulting electrode. It specifically shows the porosity of the electrodes (positive electrodes) of Examples 1 and 2 and the discharge capacity of the batteries. As is shown, since the dried positive electrode active material paste is pressed in Example 2, the adhesion between the positive electrode current collector 4 and the positive electrode active material layer 6 is improved to reduce the contact resistance between the positive electrode current collector 4 and the positive electrode active material layer 6, and the connection among the conducting agent particles 9 is also improved to form more current collecting networks in the positive electrode active material layer 6 thereby to reduce the resistivity of the positive electrode active material layer in the normal state. Accordingly, the resistivity of the electrode in its normal state can be reduced.

Further, the resin 11 enters among adjacent positive electrode active material particles 8, among adjacent conducting agent particles 9, and between the positive electrode active material 8 and the conducting agent 9 that are adjacent to each other. Therefore, the resin 11 efficiently functions in severing the contact among the positive electrode active material particles 8, the contact among the conducting agent particles 9, and the contact between the positive electrode active material 8 and the conducting agent 9 in case of abnormality. Thus, the electrode resistivity can be increased in case of abnormality.

Since the dried positive electrode active material paste is pressed at the melting point of the resin 11 or thereabouts, the resin 11 melts to further improve the adhesion between the positive electrode current collector 4, which results in further reduction of the contact resistance between the positive electrode current collector and the positive electrode active material layer 6. On the resin's melting, the porosity is reduced to bring about further improved connection among the conducting agent particles 9, forming more current collecting networks in the positive electrode active material layer 6. As a result, the resistivity of the electrode in its normal state can be reduced further.

Where the prescribed temperature is set at or in the vicinity of the melting point of the resin 11, the resin 11 is deformed and enters among adjacent positive electrode active material particles 8, among adjacent conducting agent particles 9, and between the positive electrode active material 8 and the conducting agent 9 that are adjacent to each other. Therefore, the resin 11 efficiently functions in severing the contact among the positive electrode active material particles 8, the contact among the conducting agent particles 9, and the contact between the positive electrode active material 8 and the conducting agent 9 in case of abnormality. As a result, the electrode resistivity can be increased higher in case of abnormality.

These results suggest that the resistivities of an electrode in its normal state and in an abnormal state can be well balanced by adjusting the temperature or pressure (planar pressure) in pressing the dried positive electrode active material paste.

EXAMPLE 3

Preparation of Positive Electrode:

A positive electrode active material paste was prepared by dispersing 90 parts by weight of a positive electrode active material (e.g., $LiCoO_2$), 4 parts by weight of a binder (e.g., PVDF), and 6 parts by weight of a conducting agent (e.g., artificial graphite KS-6, produced by Lonza) in NMP, a dispersing medium. The resulting positive electrode active material paste was applied to a 20 μm thick metal film (aluminum foil) functioning as a positive electrode current collector 4 by a doctor blade coating method, dried at 80° C., and pressed at a prescribed temperature (e.g., room temperature) under a prescribed planar pressure (e.g., 2 ton/cm$^2$) to form a positive electrode active material layer 6 having a thickness of about 100 μm on the positive electrode current collector 4.

Preparation of Negative Electrode:

A negative electrode active material paste was prepared by dispersing 90 parts by weight of MCMB, 5 parts by weight of a powdered resin (e.g., powder of high-density polyethylene having an average particle size of 0.1 μm and a melting point of 135° C.), and 5 parts by weight of PVDF in NMP. The resulting negative electrode active material paste was applied to 20 μm thick copper foil, a negative electrode current collector 5, by a doctor blade coating method and pressed under a prescribed planar pressure (e.g., 2.0 ton/cm²) to obtain a negative electrode 2 having a negative electrode active material layer 7 on the negative electrode current collector 5.

Figure 5:
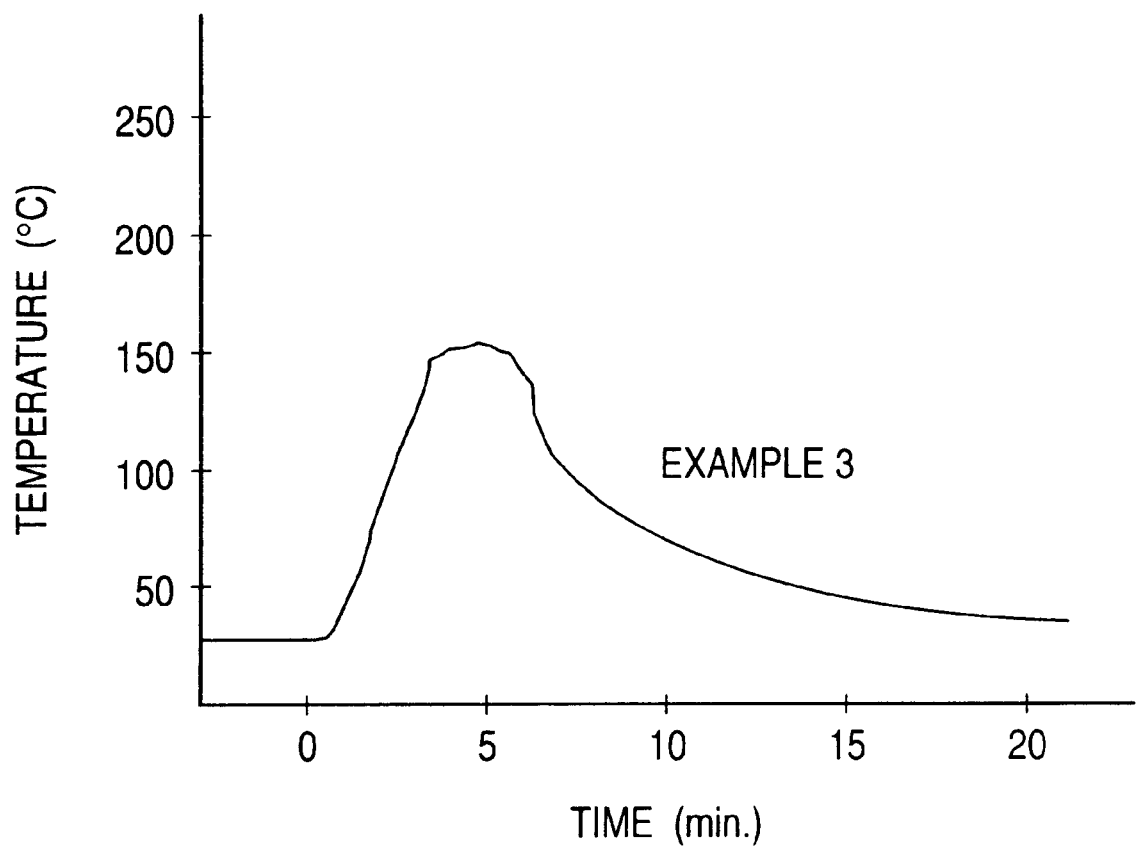
FIG. 5 is a graph showing the relationship of battery temperature against passage of time in a nail test.

FIG. 5 is a graph displaying the characteristics of the battery using the electrode of Example 3. It specifically shows the relationship of battery temperature and passage of time in a nail test. In Example 3 since the electrode (the negative electrode active material layer 7 of the negative electrode 2) contains a polyethylene resin 11 the melting point of which is lower than 160° C., the short-circuit current begins to decrease before the battery temperature exceeds 160° C. Thus, the battery has improved safety and reliability.

It is understood that the temperature at which the PTC function is manifested can be lowered below 160° C. without impairing the battery performance by selecting the resin 11 to be contained in the electrode from those having a melting point ranging from 90° to 160° C.

EXAMPLE 4

Figure 6:
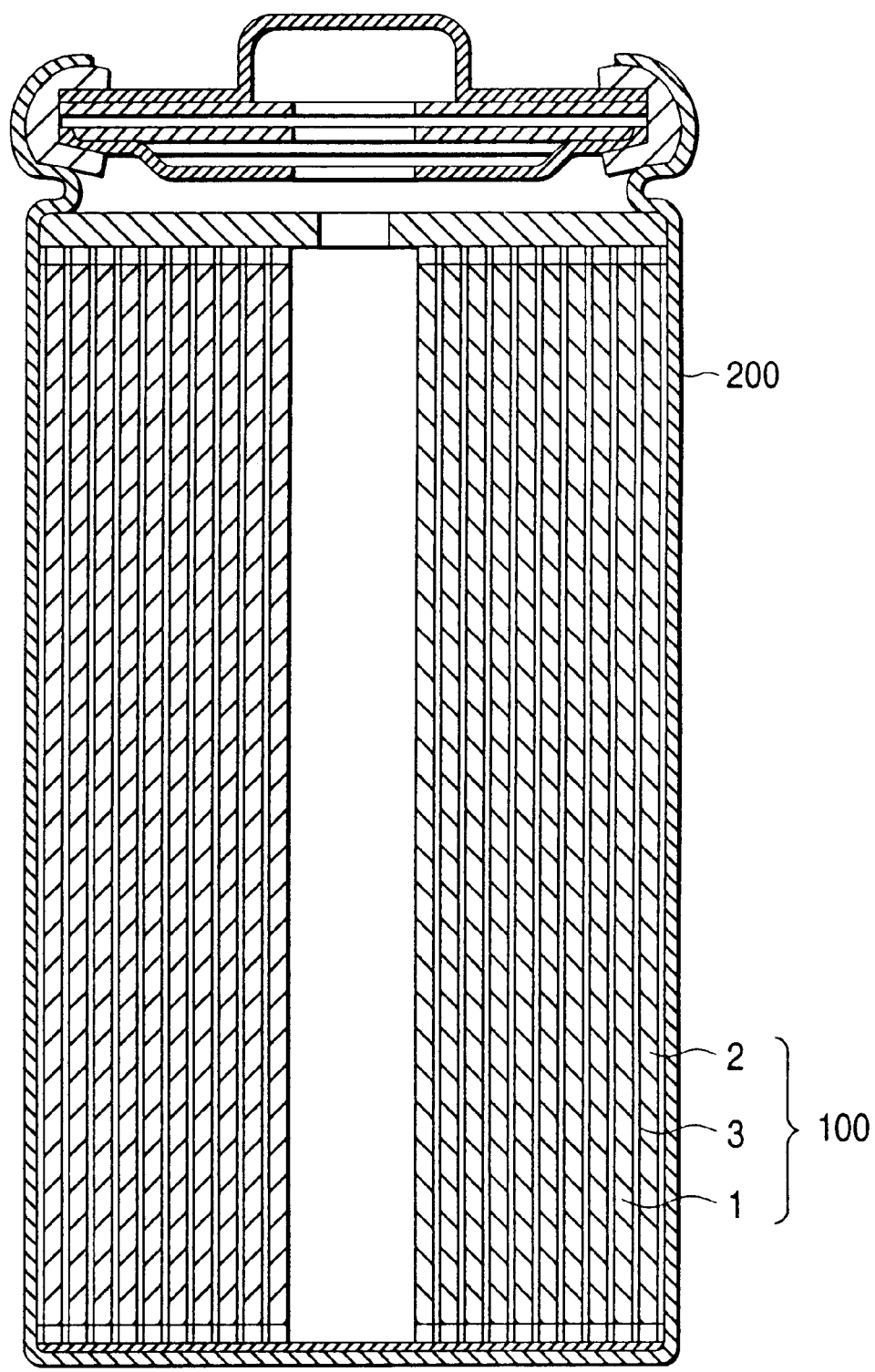
FIG. 6 is a cross-sectional view showing the structure of a cylindrical lithium ion secondary battery.

FIG. 6 illustrates an example of applications of the electrodes and batteries described in the foregoing Examples to a lithium ion secondary battery. Specifically, it is a cross section illustrating the structure of a cylindrical lithium ion secondary battery.

In the Figure, numeral 200 is a case made of stainless steel, etc. which also serves as a negative electrode terminal, and numeral 100 is a battery body put in the case 200. The battery body 100 has a roll form in which a positive electrode 1, a separator 3, and a negative electrode 2 are rolled up together. The positive electrode 1 of the battery body 100 has the structure of either one of the electrodes described in Examples 1 and 2. Or, the negative electrode 2 of the battery body 100 may have the structure shown in Example 3.

Having the above-described structure, in case where the battery should increase the current due to a short-circuit outside or inside the battery to have an elevated temperature above a certain point, the positive electrode active material layer 6 increases its own resistivity to reduce the current flowing inside the battery. Accordingly, the battery assembled by using the electrode has markedly improved safety, maintaining the safety even in case of abnormalities, such as a short-circuit under strict conditions, a back charge, an overcharge, and the like.

The electrodes and the batteries shown in the foregoing Examples are applicable to not only lithium ion secondary batteries of organic electrolytic solution type, solid electrolyte type or gel electrolyte type but primary batteries, such as a lithium-manganese dioxide battery, and other types of secondary batteries. They are also effective in primary and secondary batteries of aqueous solution type. Further, the battery shape is not limited, and applications include primary and secondary batteries of laminated type, rolled type, button type, and the like.

Industrial Applicability

The electrode and the battery according to the invention are applicable to not only lithium ion secondary batteries of organic electrolytic solution type, solid electrolyte type or gel electrolyte type but primary batteries, such as a lithium-manganese dioxide battery, and other types of secondary batteries. They are also effective in primary and secondary batteries of aqueous solution type. Further, the battery shape is not limited, and applications include primary and secondary batteries of laminated type, rolled type, button type, and the like.

What is claimed is:

1. An electrode comprising
    an active material in a form of active material particles;
    a conducting agent, which is in electrical contact with the active material and is in a form of conducting agent particles; and
    a resin, which is in direct contact with at least one of the active material and the conducting agent and is a form of resin particles, wherein
    the resin particles are smaller than the active material particles; and
    the resin expands in volume with a rise in temperature to reduce the electrical contact between the conducting agent and the active material.

2. The electrode as set forth in claim 1, wherein the resin has a melting point in a range from 90° C. to 160° C.

3. The electrode as set forth in claim 1, wherein the resin has a particle size in a range from 0.05 μm to 100 μm.

4. The electrode as set forth in claim 1, wherein the resin comprises crystalline regions.

5. A battery comprising a positive electrode; a negative electrode; and an electrolytic solution provided between the positive and the negative electrodes, wherein the positive electrode or the negative electrode is the electrode of claim 1.

6. A method of fabricating an electrode, the method comprising
    dispersing a conducting agent, an active material and a resin powder in a dispersing medium to make an active material paste; and
    pressing the active material paste to form the electrode of claim 1.

7. The method as set forth in claim 6, further comprising heating the active material paste to the melting point of the resin.

8. A battery comprising a positive electrode; a negative electrode; and an electrolytic solution provided between the positive and the negative electrodes, wherein the positive electrode or the negative electrode is the electrode of claim 2.

9. A battery comprising a positive electrode; a negative electrode; and an electrolytic solution provided between the positive and the negative electrodes, wherein the positive electrode or the negative electrode is the electrode of claim 3.

10. A battery comprising a positive electrode; a negative electrode; and an electrolytic solution provided between the positive and the negative electrodes, wherein the positive electrode or the negative electrode is the electrode of claim 4.

11. The electrode as set forth in claim 1, further comprising a binder, wherein the active material particles, the conducting agent particles, and the resin particles are bound in a matrix of the binder.

12. The electrode as set forth in claim 11, wherein the binder comprises polyvinylidine fluoride.

13. The electrode as set forth in claim 1, wherein the resin is selected from the group consisting of polyethylene, polyurethane and polyvinyl chloride.

* * * * *

UNITED STATES PATENT AND TRADEMARK OFFICE
CERTIFICATE OF CORRECTION

PATENT NO. : 6,440,605 B1
DATED : August 27, 2002
INVENTOR(S) : Kise et al.

It is certified that error appears in the above-identified patent and that said Letters Patent is hereby corrected as shown below:

<u>Title page, Item [54] and Column 1, lines 1 & 2,</u>
The Title should read as follows:

-- ELECTRODE, METHOD OF PRODUCING ELECTRODE, AND CELL COMPRISING THE ELECTRODE --

Signed and Sealed this

Seventeenth Day of December, 2002

JAMES E. ROGAN
*Director of the United States Patent and Trademark Office*